(12) United States Patent
Katyl et al.

(10) Patent No.: US 7,061,188 B1
(45) Date of Patent: Jun. 13, 2006

(54) INSTANT START ELECTRONIC BALLAST WITH UNIVERSAL AC INPUT VOLTAGE

(75) Inventors: Robert H. Katyl, Shavertown, PA (US); David W. Dranchak, Endwell, NY (US)

(73) Assignee: Technical Consumer Products, Inc., Aurora, OH (US)

( * ) Notice: Subject to any disclaimer, the term of this patent is extended or adjusted under 35 U.S.C. 154(b) by 102 days.

(21) Appl. No.: 10/283,589

(22) Filed: Oct. 30, 2002

Related U.S. Application Data

(60) Provisional application No. 60/368,857, filed on Mar. 29, 2002.

(51) Int. Cl.
*G05F 1/00* (2006.01)
*H05B 1/02* (2006.01)

(52) U.S. Cl. ...................... 315/291; 315/226

(58) Field of Classification Search ................ 315/307, 315/209 R, 229, DIG. 4, DIG. 7, 312, 291, 315/302, 224, 226; 363/132, 98, 17, 27, 363/136
See application file for complete search history.

(56) References Cited

U.S. PATENT DOCUMENTS

| | | | |
|---|---|---|---|
| 5,177,408 A | | 1/1993 | Marques |
| 5,214,355 A | | 5/1993 | Nilssen |
| 5,495,149 A | * | 2/1996 | Hiramatsu et al. ...... 315/209 R |
| 5,519,289 A | * | 5/1996 | Katyl et al. .................. 315/224 |
| 5,559,405 A | | 9/1996 | Notohamiprodjo |
| 5,650,925 A | * | 7/1997 | Hesterman ................... 363/132 |
| 5,834,906 A | | 11/1998 | Chou et al. |
| 6,023,132 A | * | 2/2000 | Crouse et al. ............... 315/307 |
| 6,100,642 A | * | 8/2000 | Kim .............................. 315/205 |
| 6,181,084 B1 | * | 1/2001 | Lau .............................. 315/291 |
| 6,326,740 B1 | * | 12/2001 | Chang et al. ................ 315/291 |
| 6,362,575 B1 | * | 3/2002 | Chang et al. ................ 315/224 |
| 6,515,437 B1 | * | 2/2003 | Zinkler et al. ............... 315/312 |
| 6,674,251 B1 | * | 1/2004 | Langeslag et al. .......... 315/291 |
| 6,696,803 B1 | * | 2/2004 | Tao et al. .................... 315/291 |

* cited by examiner

*Primary Examiner*—Tuyet Vo
*Assistant Examiner*—Minh Dieu A
(74) *Attorney, Agent, or Firm*—Joseph H. Taddeo

(57) ABSTRACT

The present invention relates to an electronic ballast that energizes fluorescent lamps connected in a parallel configuration. The ballast employs a power factor correcting boost converter that can be used over a wide range of AC line voltages to provide regulated power to a self-oscillating sine wave inverter that drives the fluorescent lighting load at high frequencies. The inverter employs special networks that limit a certain type of shoot-through current, and thus improve the efficiency of the unit. Also included is a restart circuit that limits power losses during the zero lamp condition, by periodically interrupting the inverter operation when the zero lamp state is detected. To improve operation of the power factor correcting circuitry over the wide range of AC line voltages, a DC offset is added to the sampled AC voltage at the higher AC line voltages by Zener diode based coupling circuit.

28 Claims, 11 Drawing Sheets

INSTANT START ELECTRONIC BALLAST WITH UNIVERSAL AC INPUT VOLTAGE

REFERENCE TO PREVIOUSLY FILED APPLICATIONS

This patent application is a continuation of and claims priority from U.S. Provisional Patent Application No. 60/368,857 filed on Mar. 29, 2002.

FIELD OF THE INVENTION

The present invention relates primarily to electronic ballasts, and more particularly to energy efficient instant start electronic ballasts that operate over a wide range of AC input voltages.

BACKGROUND OF THE INVENTION

With the increased interest in energy conservation, lighting systems that use less energy and are easy and cost-effective to install are becoming more important. This conclusion is apparent when one considers that lighting uses about 30% of the energy consumed in the United States. An effective method of reducing energy consumption that has been found by the lighting industry is to employ electronic ballasts that energize the lamps with high frequency alternating currents, operating at frequencies in the 20 kHz to 100 kHz range. Electrical energy in this frequency range is efficiently generated by use of sine wave inverter circuitry that converts a DC voltage into the high frequency sine wave power that is coupled to the lamps.

An instant start electronic ballast does not employ any filament preheat mechanism to assist in thermionic emission from the lamp electrodes, but relies upon sudden application of a high voltage between the lamp electrodes to ignite the gas discharge within the lamp. Thus, in an instant start ballast, the ballast circuit must provide a high voltage into the open circuit load that the lamps present before they are ignited. However, after ignition the lamp impedance changes to a low value. This low value of impedance becomes even lower with increasing lamp current, a property of gas discharge electrical loads. This lowering of the lamp impedance with current, known as negative resistance, can cause circuit instability unless an impedance known as the ballast impedance is placed in series with the lamp load. The presence of the ballast impedance helps maintain stable operation, and also plays a role in determining the final lamp current.

For a ballast to operate over a wide range of line voltages, a pre-converter stage may be employed that boosts the incoming voltage to a value higher than the peak value of the highest AC voltage that the unit will use. This pre-converter also known as a boost converter typically uses an industry standard integrated circuit to perform this power conversion in a way such that the AC load current follows the incoming AC line voltage. This methodology, known as Power Factor Correction (PFC), greatly improves the electrical power factor of the incoming AC current. In a large lighting installation this is an important feature as it reduces the amount of re-circulating reactive power in the building wiring and the electrical utility transformers and feeders allowing more useful power to be transmitted through the electrical transmission of the utility company. Power factor correction circuits in prior art ballast circuits can have difficulty in properly operating over the wide or universal AC input voltage range. A circuit that shifts a sampled voltage input in a power factor corrector chip to a more linear region of the chip characteristics would improve the overall performance of the ballast.

The output of the PFC boost converter in an electronic ballast is a DC voltage whose value exceeds the peak value of the highest AC voltage within the operating range of the ballast. An inverter stage is used to convert this DC voltage into the high frequency sine wave voltage required to operate the lamps efficiently. An inverter that is frequently used for instant start ballasts is a self-oscillating half bridge circuit that is current fed through an isolation choke. A cause of heating of the transistor switches in this type of inverter is a particular type of shoot-through current that occurs during the brief switching interval when the transistors switch from one being on to the other being on. This heating becomes larger when reduced power is being converted, such as occurs with shorter lamps are used, or when the number of lamps is reduced. Circuitry that reduce the size of the shoot-through current, and reduces circuitry power losses in the inverter would improve the overall performance and the reliability of the ballast.

During conditions of operation when no lamps are connected to the ballast circuit, overheating of the inverter components may occur. To reduce the overheating in this condition and thus improve the overall performance and the reliability of the ballast, power to the inverter is cyclically switched ON and OFF under control of a zero lamp sense circuit. When a new lamp is installed, normal operation is resumed without disconnection and reconnection of the AC power source as is required by some designs. This provides for the ability of lamp changing within a facility without the need of turning lamps ON and OFF.

Examples of such prior art are shown in the examples that follow.

U.S. Pat. No. 5,177,408, granted Jan. 5, 1993, to A. Marques, discloses a startup delay circuit for an electronic ballast for "instant start" type fluorescent lamps of the type having an electronic converter powered by an active electronic preregulator. The converter is a inductive-capacitive parallel resonant, push-pull circuit or any other type of current fed power resonant circuit. The preregulator may be of a boost type—the startup circuit may be either resistor and Zener diode, or resistor, capacitor and Diac network or programmable unijunction transistor circuit connected between the preregulator output and an oscillator enabling input of the converter.

U.S. Pat. No. 5,214,355, granted May 25, 1993, to O. K. Nilssen, discloses an instant start electronic ballast is comprised of a first and second AC output voltage, where the second AC voltage is delayed roughly 90 degrees from the first AC voltage, which results in the voltage across the tank inductor being approximately sinusoidal in shape. A first and a second fluorescent lamp are connected in series with the first and a second ballast capacitor, respectively and the two-lamp capacitor series combination are connected in parallel across the inductor, thereby resulting in a sinusoidal current being provided to the lamps.

U.S. Pat. No. 5,559,405, granted Sep. 24, 1996, to Hubin [0081] otohamiprodjo, discloses a ballast for operating a gas discharge lamp having a voltage boost, a half-wave bridge inverter and a parallel resonant circuit. An inverter control inhibits operation when the power is initially applied to the ballast.

U.S. Pat. No. 5,834,906, granted Nov. 10, 1998, to J. Chou, et al., discloses an electronic ballast for driving a fluorescent lamp which includes an EMI filter and power circuit, a preconditioner coupled to the EMI filter and power circuit, and an inverter circuit coupled to the preconditioner for energizing the fluorescent lamp. The preconditioner includes an active power factor controller and a boost circuit that is controlled by the active power factor controller. The active power factor controller has a reference voltage input to which is applied a reference voltage. At the startup, the inverter applies a time varying signal that is rectified. At least a portion of the rectified signal is fed back to the reference voltage input of the active power factor controller to boost the reference voltage to a level above normal so that the active power factor controller will cause greater current to flow through the boost circuit, causing the boost circuit to generate a DC rail voltage more rapidly, which rail voltage is provided to the inverter circuit to ignite and operate the fluorescent lamp.

All of the above referenced prior art, disclose instant start electronic ballast circuitry for use with fluorescent lamps. However, none of the prior art teach the use parallel connected lamps that operate over a wide applied operating voltage range; lamps that can be disconnected while the AC line voltage source is applied.

What is needed is an energy efficient instant start electronic ballast that is capable of operating a plurality of parallel connected gas discharge lamps that can be operated over a wide range of applied AC voltages and having an automatic restart capability without interruption of the power source. In this regard, the present invention fulfills this need.

It is therefore an object of the present invention to provide an instant start electronic ballast for fluorescent lamps that can be used over a wide or universal range of applied AC line voltages while maintaining adequate power factor correction over the entire range of operating voltages.

It is an additional object of the present invention to provide proper operation of an electronic ballast having a plurality of lamps connected in parallel, so that light is still produced when at least one lamp is connected to the ballast.

It is another object of the present invention to provide efficient operation of an electronic ballast sine wave inverter circuit, even with smaller lighting loads.

It is a still further object of the present invention to provide for reduced power consumption of an electronic ballast when no lamps are connected to the ballast.

It is a final object of the present invention to ensure that the electronic ballast provides for the automatic restart of operation when a lamp is installed, without disconnecting the applied AC power source.

SUMMARY OF THE INVENTION

The present invention describes an electronic ballast that energizes fluorescent lamps in a parallel configuration. The ballast employs a power factor correcting boost converter that can be used over a wide range of AC line voltages to provide regulated power to a self-oscillating sine wave inverter that drives the fluorescent lighting load at high frequencies. The inverter employs several novel specialized networks that limit a certain type of shoot-through current, and thus improves the efficiency of the unit.

Also included is a restart circuit that limits power losses during the zero lamp condition, by periodically interrupting the inverter operation when the zero lamp state is detected. To improve the operation of the power factor correcting circuitry over the wide range of AC line voltages, a DC offset is added to the sampled AC voltage at the higher AC line voltages by a Zener diode based coupling circuit.

BRIEF DESCRIPTION OF THE DRAWINGS

A complete understanding of the invention may be obtained by reference to the accompanying drawings when taken in conjunction with the detailed description thereof and in which.

A better understanding and appreciation of these and other objects and advantages of the present invention will be obtained upon reading the following detailed description of the preferred embodiment when taken in conjunction with the accompanying drawings.

DETAILED DESCRIPTION OF THE PREFERRED EMBODIMENT

Generally speaking, the present invention is an electronic ballast that energizes lamps in a parallel configuration. The ballast employs a power factor correcting boost converter that can be used over a wide range of AC line voltages to provide regulated power to a self-oscillating sine wave inverter that drives the fluorescent lighting load at high frequencies. The inverter employs several novel specialized networks that limit a certain type of shoot-through current, and thus improve the efficiency of the unit. Also included is a restart circuit that limits power losses during the zero lamp condition, by periodically interrupting the inverter operation when the zero lamp state is detected. To improve the operation of the power factor correcting circuitry over the wide range of AC line voltages, a DC offset is added to the sampled AC voltage at the higher AC line voltages by a Zener diode based coupling circuit.

Figure 1:
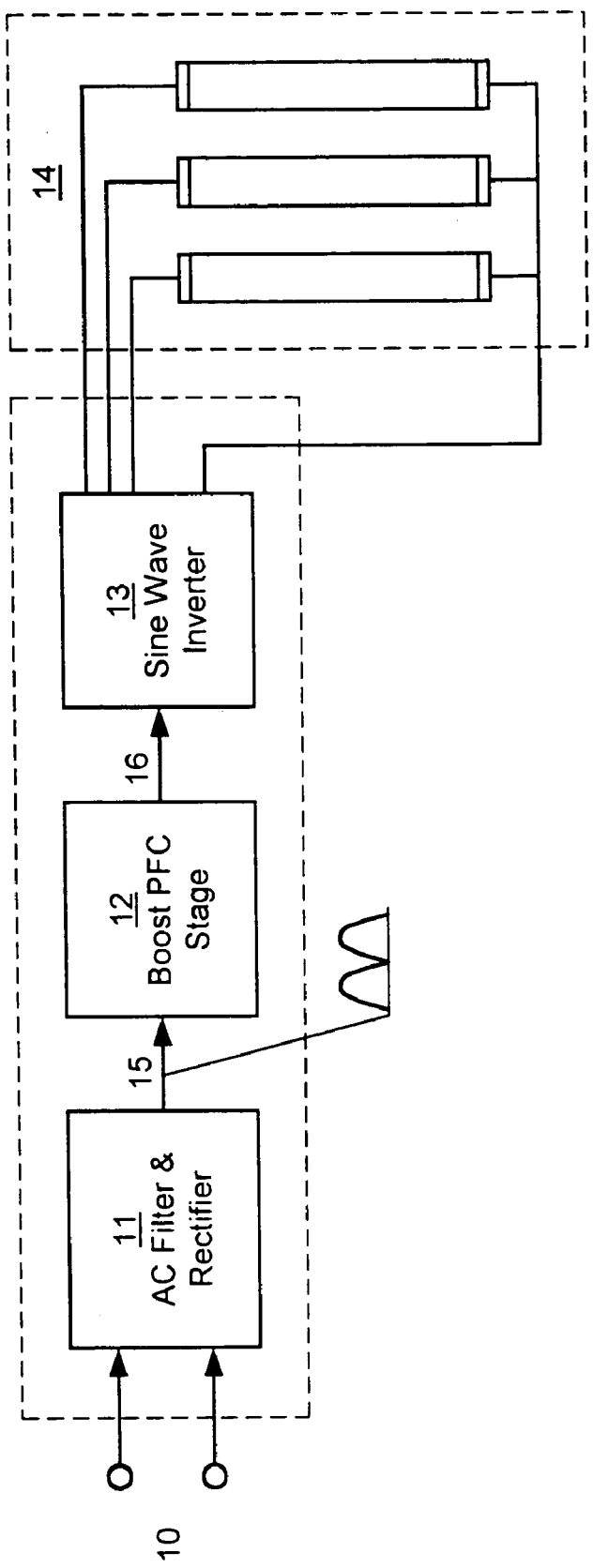
FIG. 1 is a block diagram of a typical ballast circuit.

Referring first to FIG. 1, there is shown a block diagram that shows the power flow of a typical ballast. AC power that is connected to terminals 10 is converted to high frequency power and applied to a plurality of fluorescent lamps connected in parallel, 14. Element 11 contains the ac line filter to reduce EMI emission conducted onto the power line. It also contains the AC rectifier that converts the AC sine envelope into a pulsating DC waveform, 15. Element 12 is the boost power factor converter stage (PFC). The PFC stage converts the pulsating DC waveform to a steady DC voltage, 16, while drawing a sine wave current from the power line that matches the AC line voltage. Power factor correction is desirable since lighting is often one of the largest electrical loads of a large commercial building. Having the load current match the line voltage maximizes the efficiency of the electrical utility's distribution system. The boosted DC voltage exceeds the maximum value of the pulsating DC waveform. The DC voltage is applied to the sine wave converter 13 that change the DC voltage back into a sine wave voltage, but at a much higher frequency than the applied power AC voltage. The inverter circuit applies the high frequency voltage to the lamps through a high impedance. A sufficiently high impedance is required to provide stable operation of the fluorescent lamps, 14.

Figure 2:
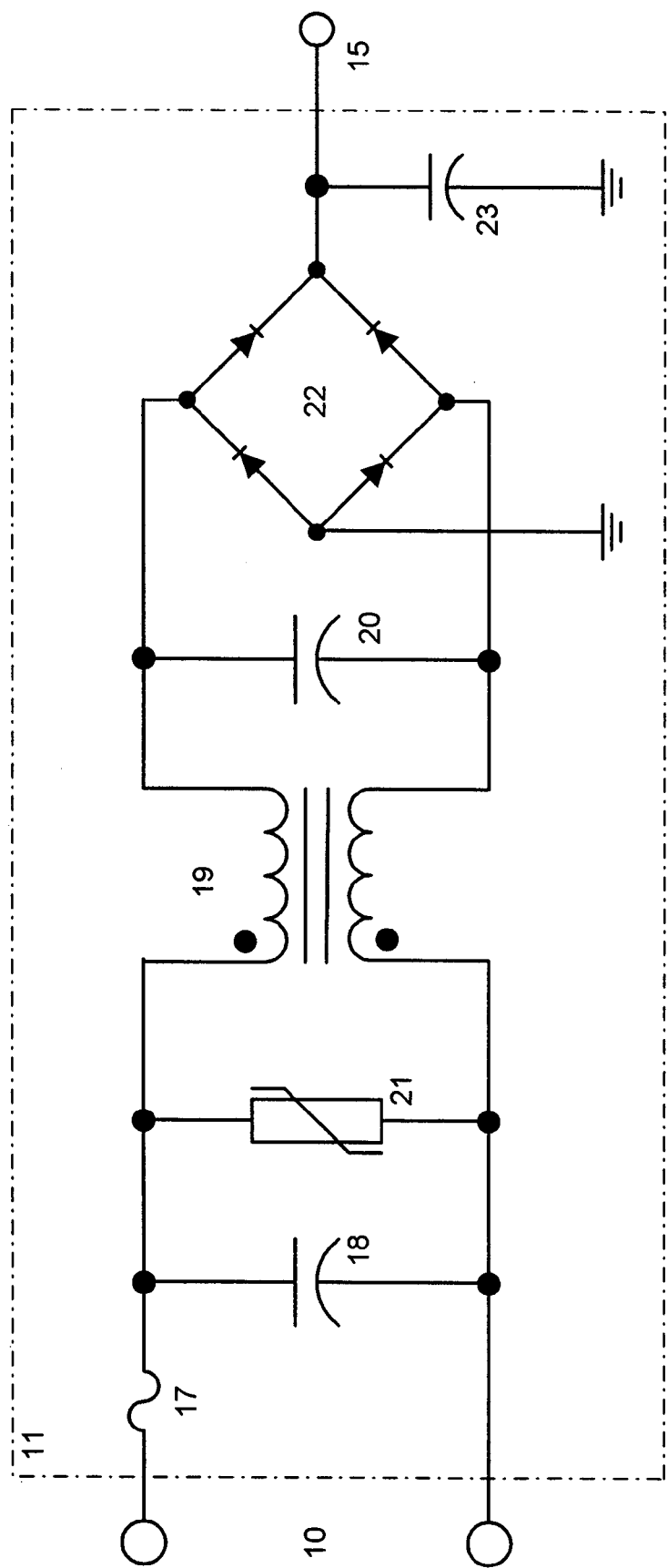
FIG. 2 is a partial schematic drawing that shows the rectifier and EMI filter section of a typical ballast.

FIG. 2 shows a schematic diagram of the AC electromagnetic interference (EMI) filter and rectifier, 11. AC voltage applied on terminals 10 passes through fuse 17 to the EMI filter which consists of capacitors 18 and 20 and common mode choke 19. Varistor 21 suppresses any transient voltage spike waveforms that may occur on the incoming AC voltage due to operation of nearby electrical motors, or lighting strikes. The full wave bridge rectifier 22 changes the AC voltage to a pulsating DC voltage that is applied to node 15. Capacitor 23 serves as a high frequency bypass capacitor for the high frequency switching currents by the following PFC circuit.

Figure 3:
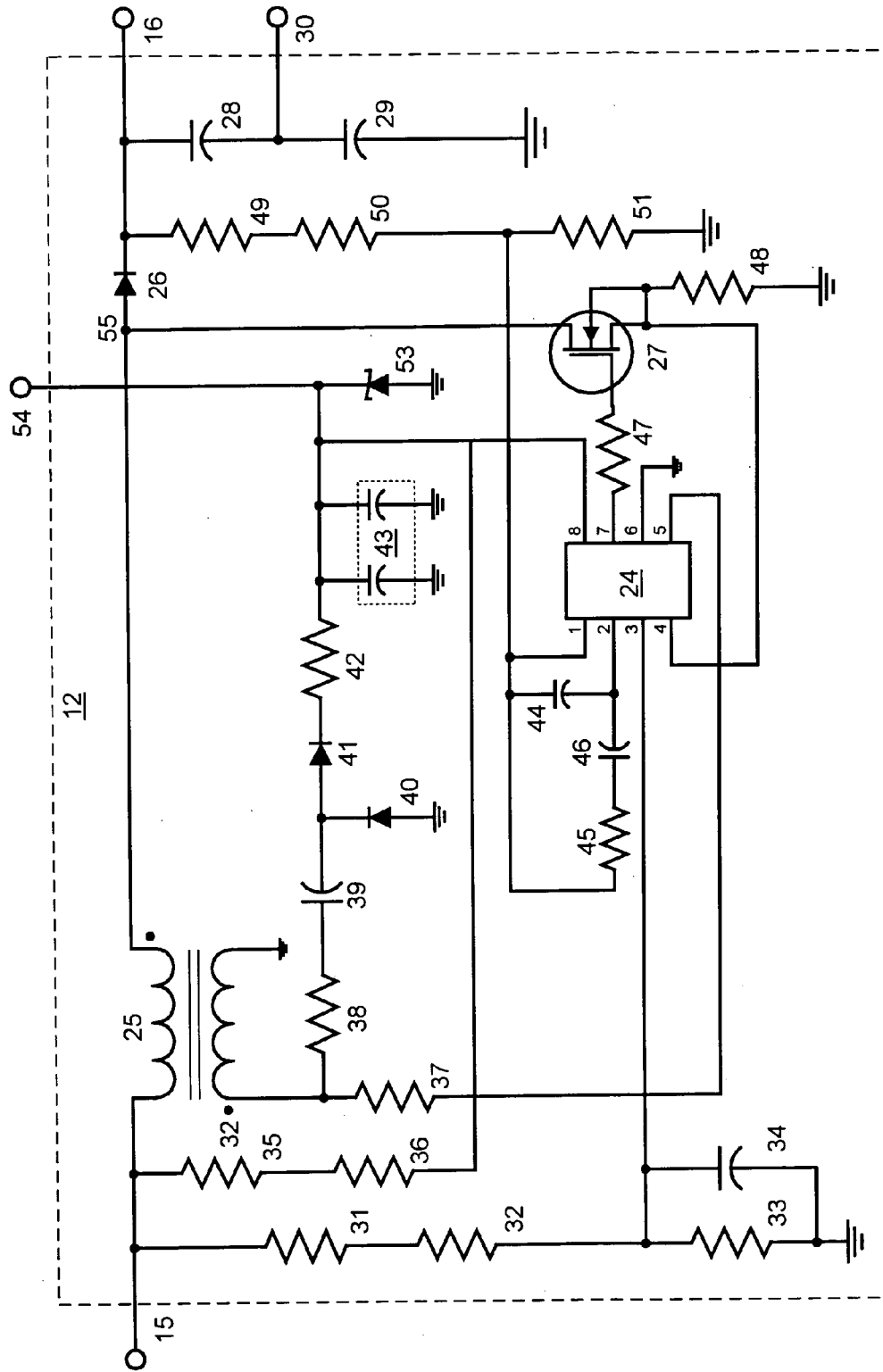
FIG. 3 is a partial schematic drawing illustrating the boost converter/power factor correction circuit of the prior art.

FIG. 3 shows a schematic diagram of a typical power factor correction circuit (PFC) 12 of the PRIOR ART. Pulsating DC voltage on node 15 is converted to a DC voltage on node 16 by action of integrated circuit IC chip 24. For illustrative purposes the IC will be preferably a L6561 IC made by ST Microelectronics. There are several other PFC chips on the market with similar functions that can be adapted for alternative use. With the proper choice of circuit parameters, the PFC action can be made to perform reasonably well over a wide range of applied AC line voltages.

The boost function is accomplished by the charge-discharge action of boost inductor 25 caused by the repeated high frequency switching of power MOSFET 27. Boost inductor 25 is charged with magnetic energy during the interval when MOSFET 27 is switched on and current flows to ground from node 55. When MOSFET 27 switch opens, the magnetic field in inductor 25 collapses causing the voltage on node 55 to increase sufficiently high above the voltage on node 16 to produce current flow into storage capacitors 28 and 29 and into the load circuit connected to node 16. A scaled down sample of the DC voltage at node 16 is applied to the IC 24 at pin 1. A division network consisting of resistors 49, 50, and 51 produces this voltage sample. It is applied to a differential error amplifier that is part of a voltage controlling servo loop. Compensation network 44, 45, and 46 integrate the detected error signal as part of this servo loop. The charging current through boost inductor is sensed by sense resistor 48 and applied to IC 24 on pin 4 as an input to a control comparator within the internal circuitry of IC 24. Division network 31, 32, 33, and 34 presents a scaled down sample of the incoming pulsating DC waveform to the IC 24 at pin 3 so that in internal circuitry can control the MOSFET 27 on time so that the average current into node 15 matches the shape of the voltage at node 15. A scaled sample of the voltage across the boost inductor is produced by a few secondary turns connected to node 52. A sample is presented to the IC 24 at pin 5 through current limiting resistor 37 for timing purposes. The clamped full wave rectifier consisting of components 38, 39, 40, 41, 42, 43, and 53 produces a DC voltage needed to energize the IC 24 at node 54. Resistors 35 and 36 provide a small current that is used to energize the chip upon initial starting of the circuit after power is first turned on.

Figure 4:
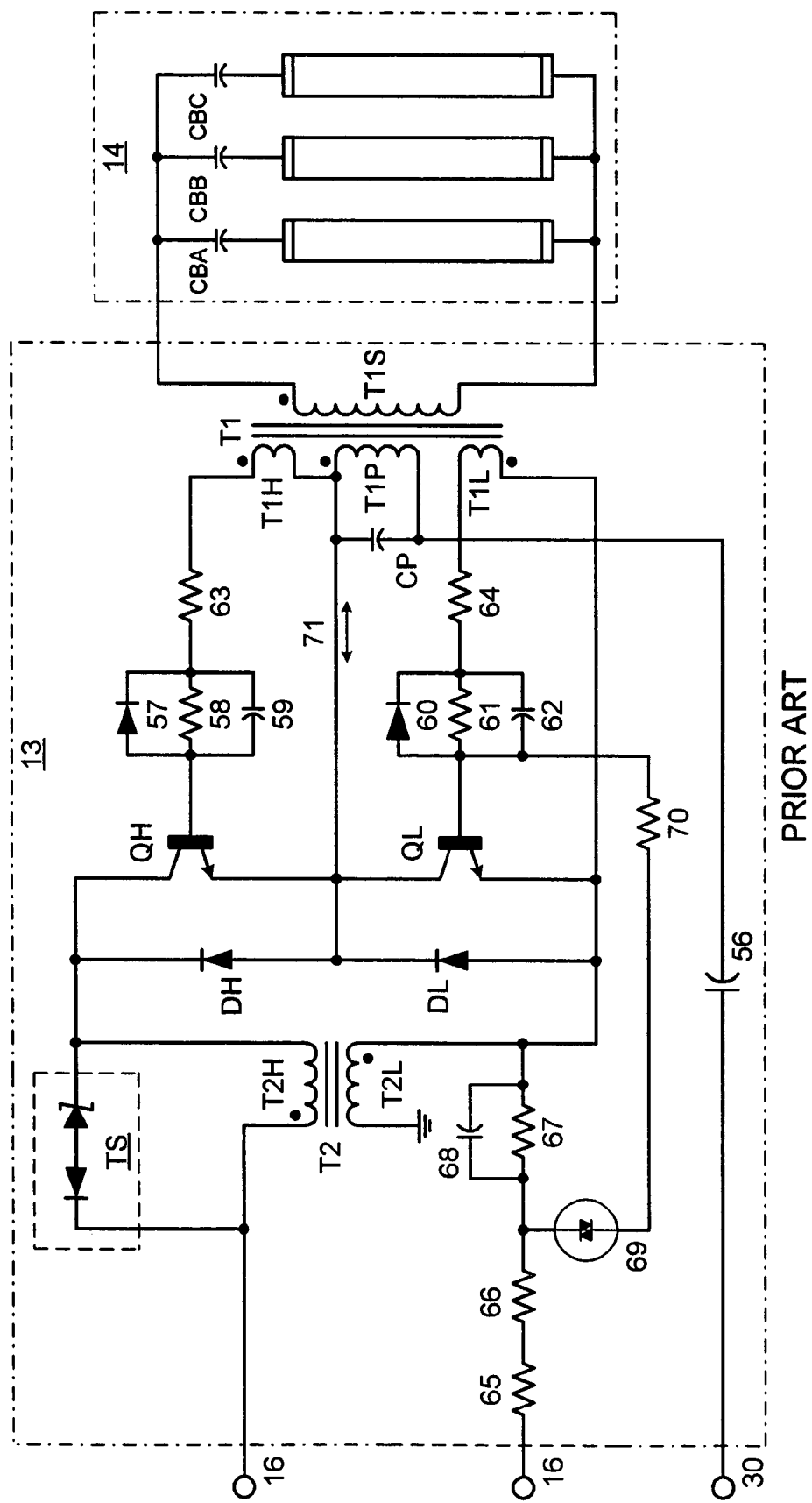
FIG. 4 is a partial schematic diagram of the sine wave inverter section of a ballast of the prior art.

As shown in the schematic diagram of FIG. 4, there is a sine wave inverter as used in many PRIOR ART electronic ballasts. The circuit can be described as a current-fed bipolar self-oscillating half-bridge sine wave inverter. Oscillating current flows back and forth through wire 71 energizing the parallel resonant tank circuit consisting of the primary inductance T1P, primary capacitor CP, and the reflected secondary load of the lamps 14 in series with ballasting capacitors CBA, CBB, and CBC. The oscillating drive current in wire 71 passes through the parallel tank circuit into blocking capacitor 56 and returns to the supply at the midpoint 30 of the two series filter capacitors 28 and 29 (as shown in FIG. 3). The oscillating drive current in wire 71 is forced through the tank circuit load from the DC supply voltage 16 by means of clamped transistor switches, QH and QL, being protected by reversed biased rectifiers DH and DL, respectively. The transistor switches QH and QL are switched ON and OFF by means of the sine wave voltages from windings T1H and T1L through the shaping networks of 57–64. The two winding isolation choke T2 helps form a constant current back and forth square wave load into wire 71. Transient suppressor network TS remove excessively large voltage spikes from choke T1. The Diac network, comprised of Diac 69, resistors 65, 66, 67, and 70, and capacitor 68, generates a sharp current into the base of QL to initiate oscillation when the ballast is first turned on, or after any cessation of oscillation that sometimes occurs during lamp ignition. When power is first applied, the full open circuit voltage is applied to the lamps. After ignition, the voltage across the lamps drops to a significantly lower value. The voltage from winding T1S remains substantially the same with the ballast capacitors CBA, CBB, CBC, dropping a significant amount. With most of the voltage drop occurring across the ballast capacitors, the current flow into the lamps is little affected by impedance changes of the lamps, thus stabilizing the lamp operation.

Figure 5:
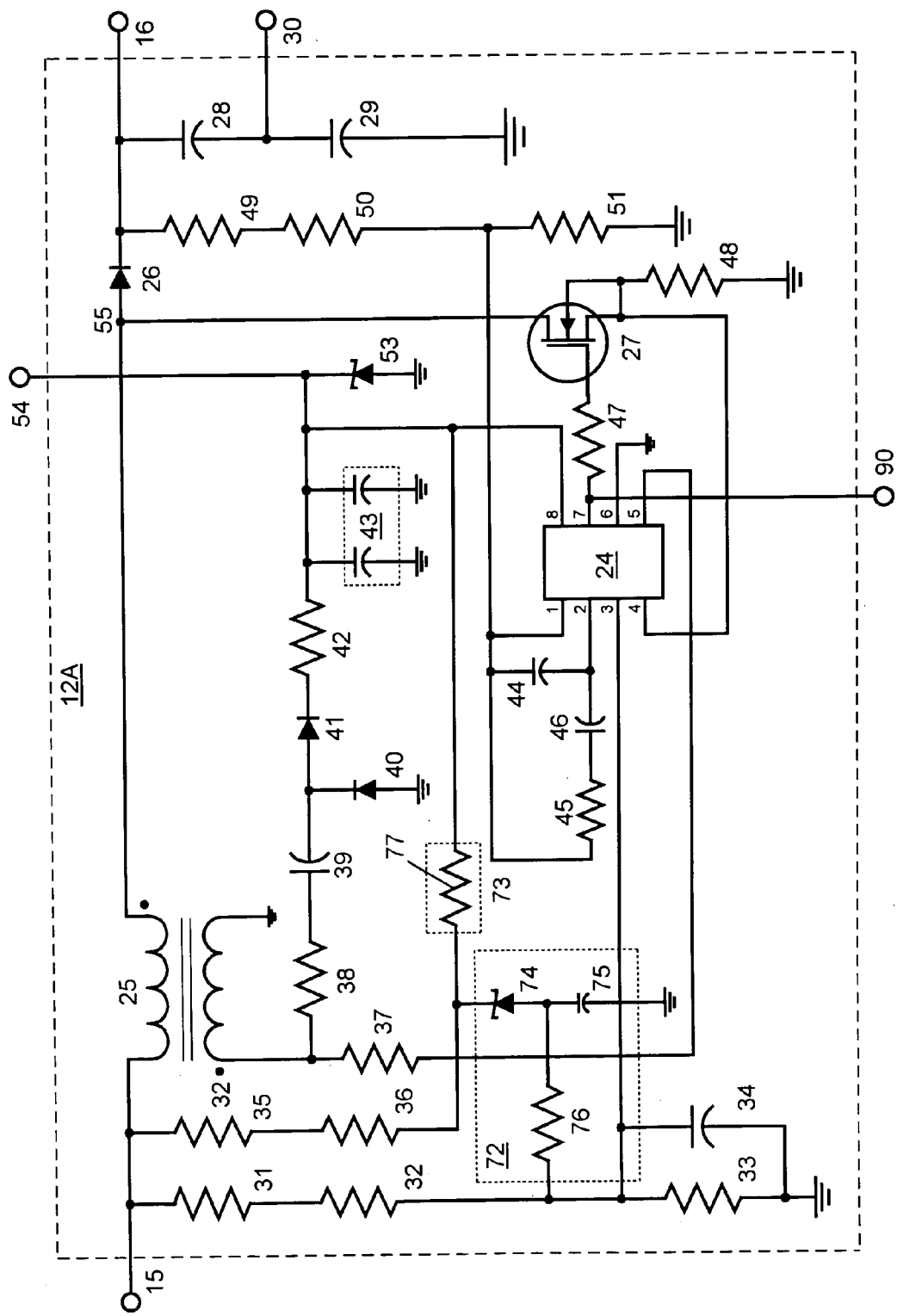
FIG. 5 is a schematic diagram detailing the boost converter/power factor correction circuit of the preferred embodiment.
Figure 6:
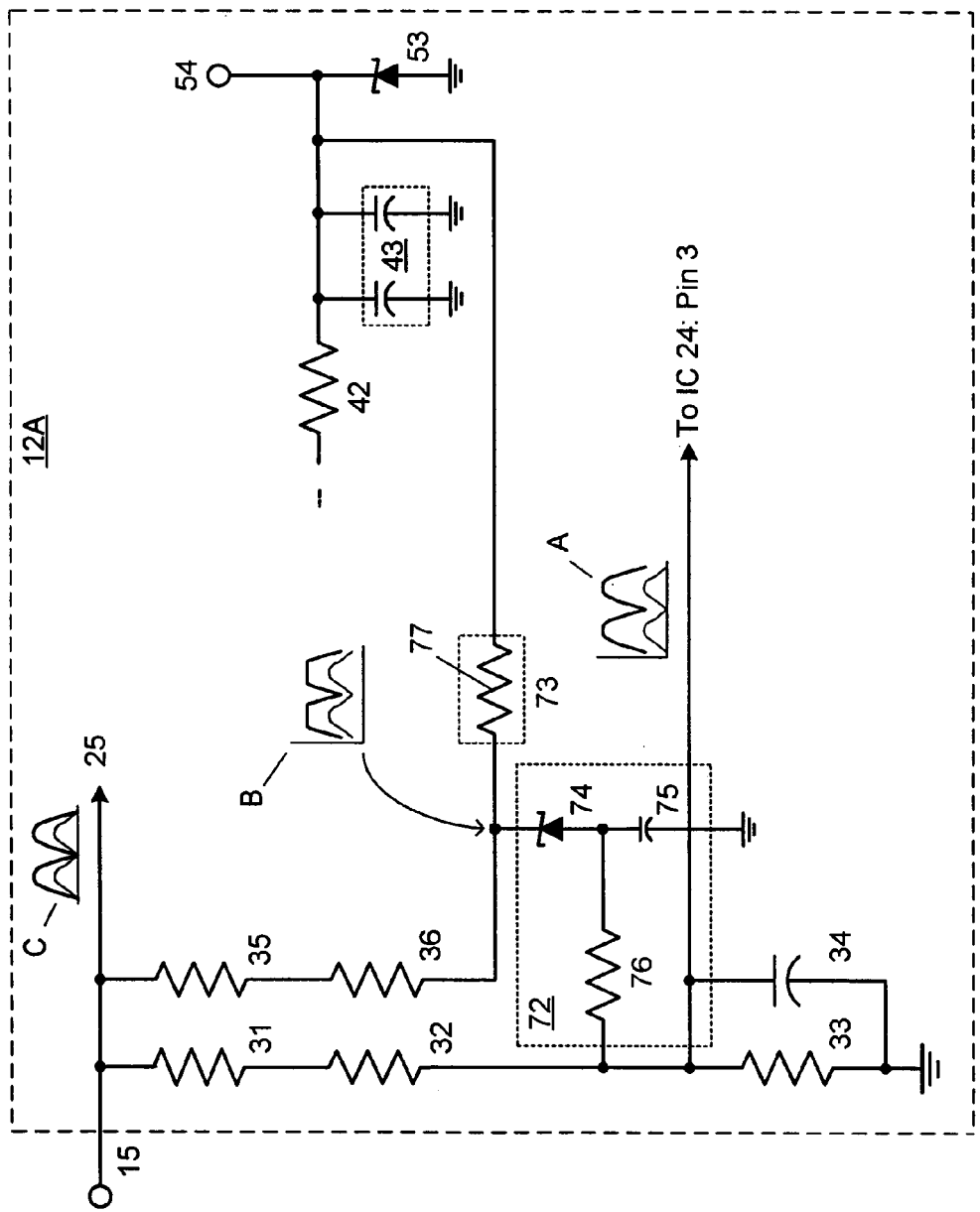
FIG. 6 is a schematic diagram of the sine wave inverter section of a ballast of the preferred embodiment.
Figure 7:
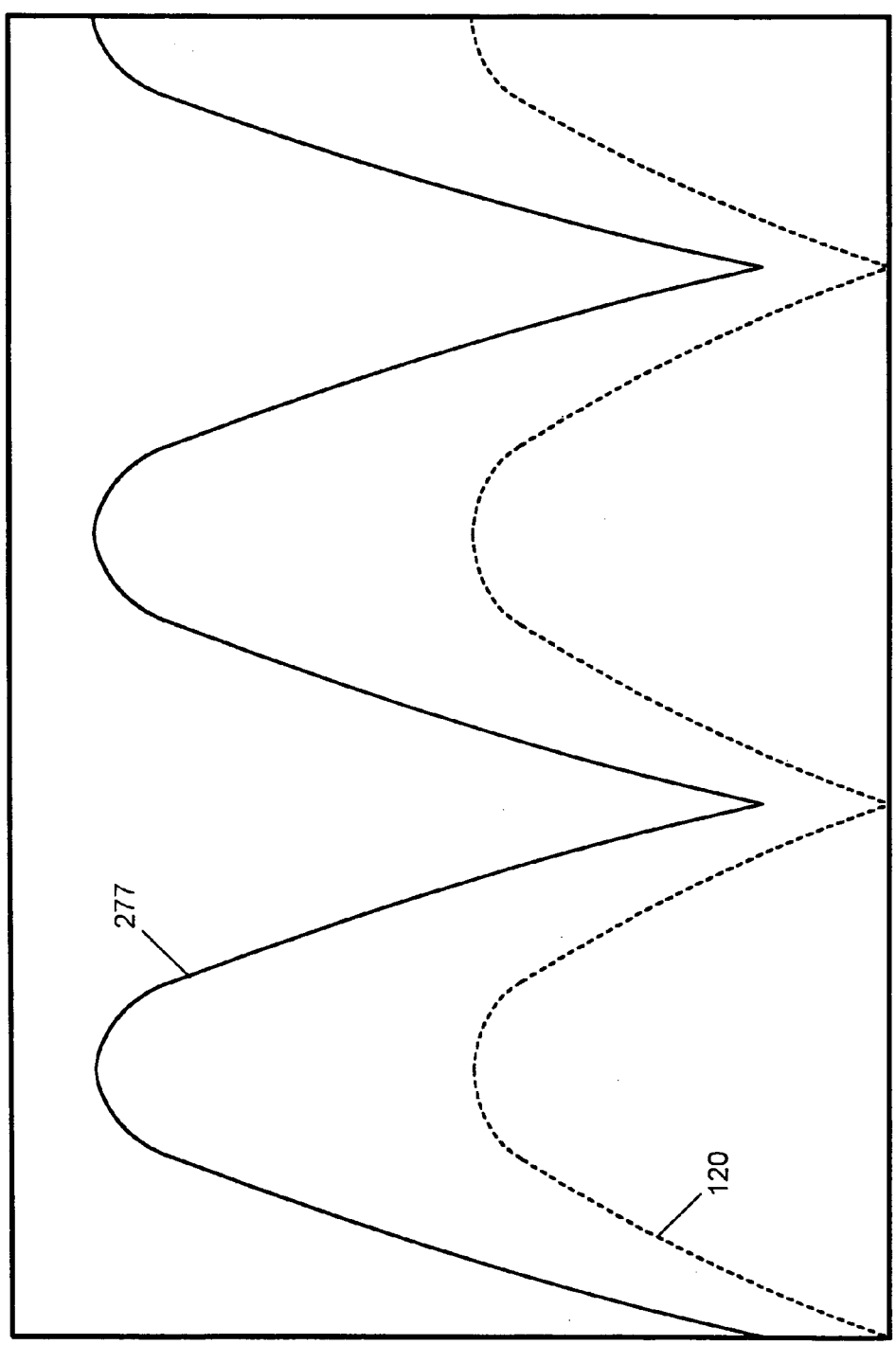
FIG. 7 shows the sinusoidal waveform illustrating the performance of the circuit that causes periodic cycling of the power to the sine wave inverter when a condition of zero lamps is sensed.
Figure 11:
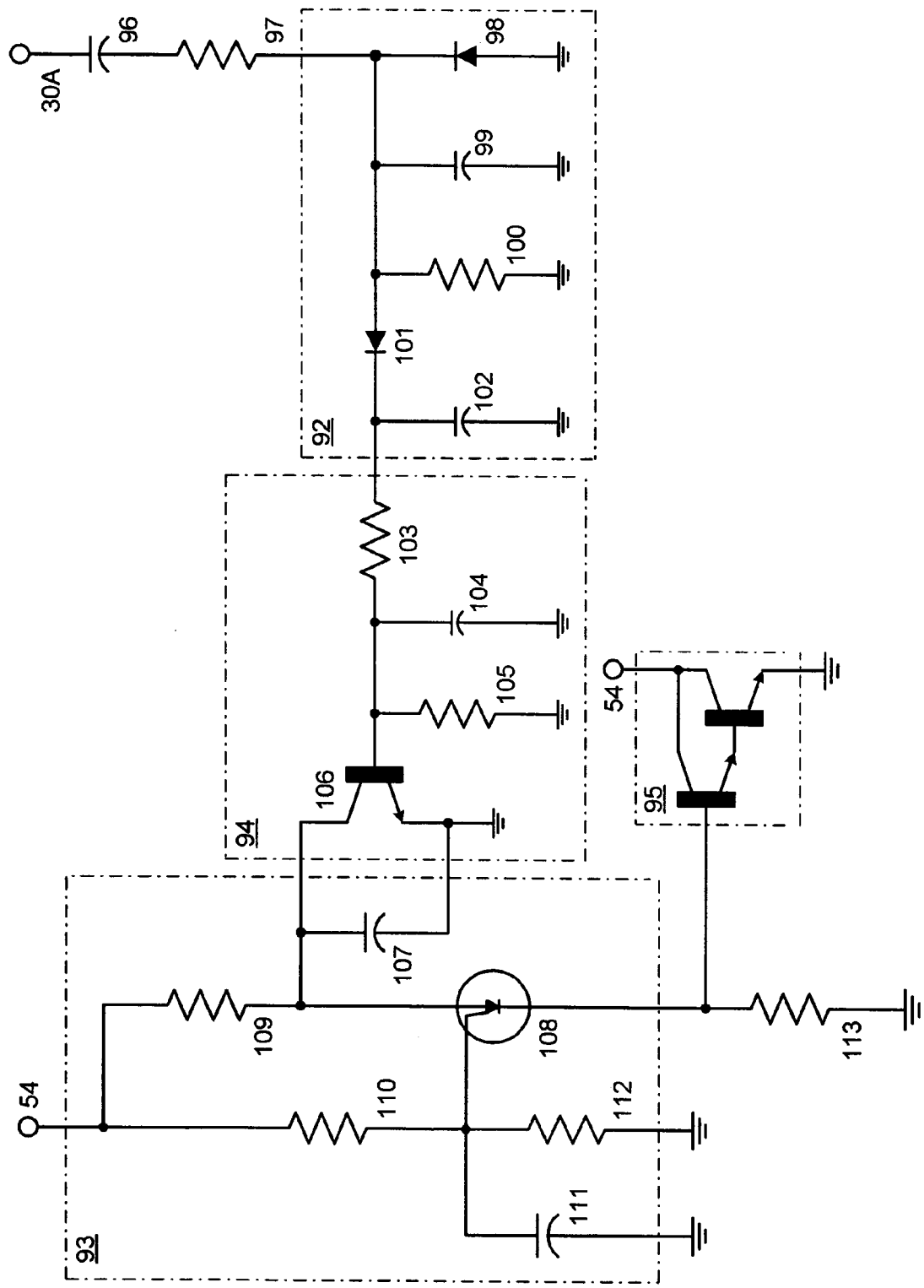
FIG. 11 is a schematic diagram detailing the Power Factor Correcting circuit being controlled during the zero lamp condition.

FIGS. 5–8 show the detail of the preferred embodiment. FIG. 5 is a schematic diagram of an improved PFC circuit. The improved circuit of FIG. 5 differs from the prior art schematic of FIG. 3 in the circuitry in Outlines 72, 73, and 80. Outline 80 is part of the circuit function that turns the inverter ON and OFF in a cyclic fashion when a no lamp condition is detected. This circuit function will be discussed below along with the discussion of FIG. 11. Outlines 72 and 73 involve the connection to pin 3 of IC 24. The new components involved are 74–77 and are shown in the circuit fragment illustrated in FIG. 6. The inventive circuit needs to maintain good PFC performance over a wide or universal range of incoming AC line voltages. The incoming rectified waveforms shown in Graph C in FIG. 6 are for the two extreme applied AC line voltages, for example, 120 and 277 volts. The signal that is required by the chip to shape the AC load current so that it matches the input AC voltage is the scaled input to pin 3 of IC 24, a connection known as the multiplier input. Because of the input characteristics of the multiplier circuit connected to pin 3, it is found that in prior art PFC circuits that the Third Harmonic Distortion (THD) is significantly higher at the higher AC line voltages that can be used in a universal input voltage ballast, for example, 277 volts. The novel circuit of FIG. 6 improves the performance and lowers Total Harmonic Distortion (THD) of the corrected line current at the higher line voltages by adding a small DC offset voltage to the pulsating AC input that is only present at the higher line voltages. This DC offset places the larger waveform into a more linear region of operation. This offset raises the input signal a slight amount above the zero voltage position, (refer to Waveform "A" of FIG. 6). This offset only occurs for line voltages above a threshold value due to action of the Zener diode 74 and the filter composed of components 75 and 76, producing the Waveforms "B" shown in the FIG. 6. Waveforms "C" show the incoming pulsating DC signal: note that there is no offset voltage. An enlarged plot of the multiplier waveform input is shown in FIG. 7.

Figure 8:
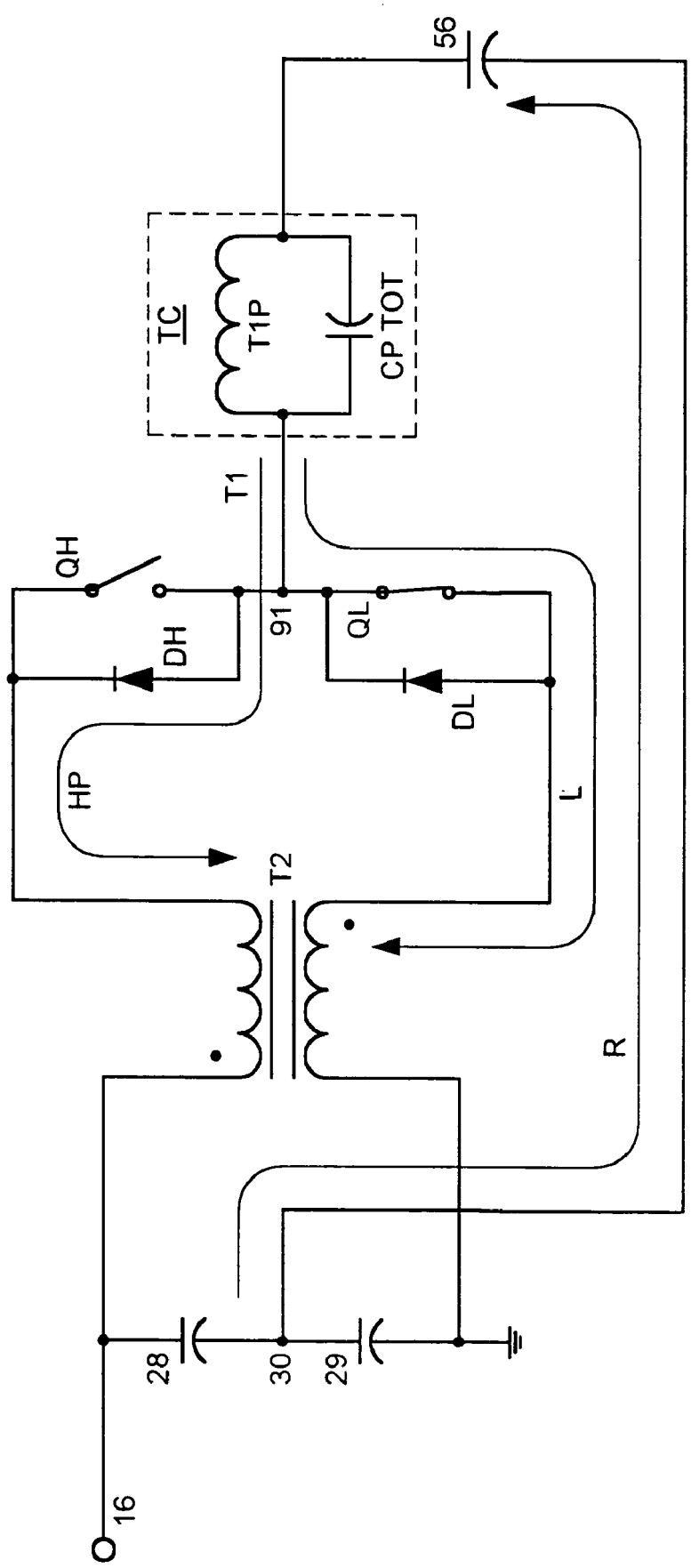
FIG. 8 is a schematic diagram that details a problem that sometimes occurs in the prior art sine wave inverter of FIG. 4.

A problem that sometimes can occur in the prior art sine wave inverter of FIG. 4 is illustrated in FIG. 8. In this figure, the current paths are shown at the end of a switch interval when transistor QL, shown in the figure as a closed switch, is about to switch open and transistor switch QH, shown as open in the figure, is about to switch to the ON state. A complementary situation occurs during the next switch interval, when the states of QH and QL are interchanged, and similar paths with reversed direction are set up involving elements reflected across the line of symmetry of the schematic. For simplicity, the discussion will be directed only to one half of the oscillatory cycle. During the steady portion of the switching interval when switch QL is closed, the main flow of power through the circuit is by means of current path L. During this interval, parasitic current HP is absent, and the inductance of the lower winding T2L of isolation choke T2 causes inductive limiting of current L. Current path L takes the current from the parallel resonant tank circuit TC, composed of transformer primary T1P and the combined impedance of capacitances and load resistances represented in this figure as CP(TOT), through closed switch QL, the lower winding T2L of isolation choke T2, and into ground and into capacitor 29. Discharge current flows out of capacitors 29 and 30 through current path R, back to tank circuit TC. Current paths from the supply node and ground node are also present but are not shown for simplicity. They serve to provide incoming energy to overcome losses in the circuit elements and the load being driven. A significant unwanted current impulse HP sometimes occurs near the time when the states of switches QL and QH are about to be interchanged, that is the main switch time. If it happens that during this situation that the voltage of node 91 rises sufficiently above that of the output of the upper winding of isolation choke T2, then bypass diode DH which has been in the open or reversed biased state until now can conduct, causing parasitic current HP to flow. By transformer action an additional current component that matches HP is added to current L. Because of the phasing of the windings of isolation choke T2, this current component is in the same direction as L. These parasitic currents combine and return to the tank circuit through path R. Isolation choke T2 has tightly coupled windings and thus provides no impedance to these signals. Thus, for a brief interval, a short circuit is placed across the tank circuit TC, causing a large unwanted parasitic current transient that can cause a significant overheating of the components involved.

Figure 9:
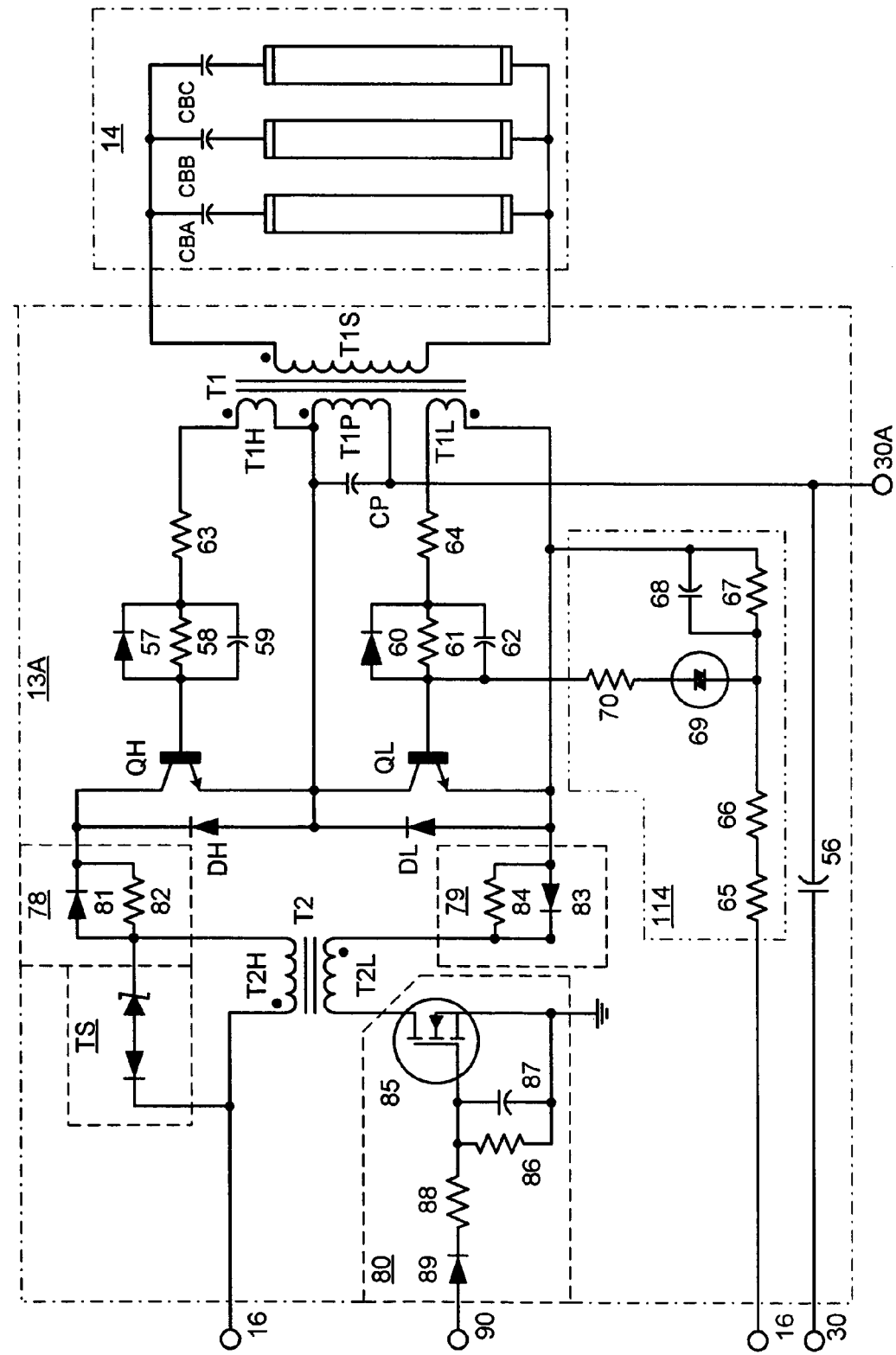
FIG. 9 details the use of resistor 82 and diode 81 of Outline 78 and the use of resistor 84 and diode 83 of Outline 79 to minimize parasitic currents as used in the preferred embodiment.
Figure 10:
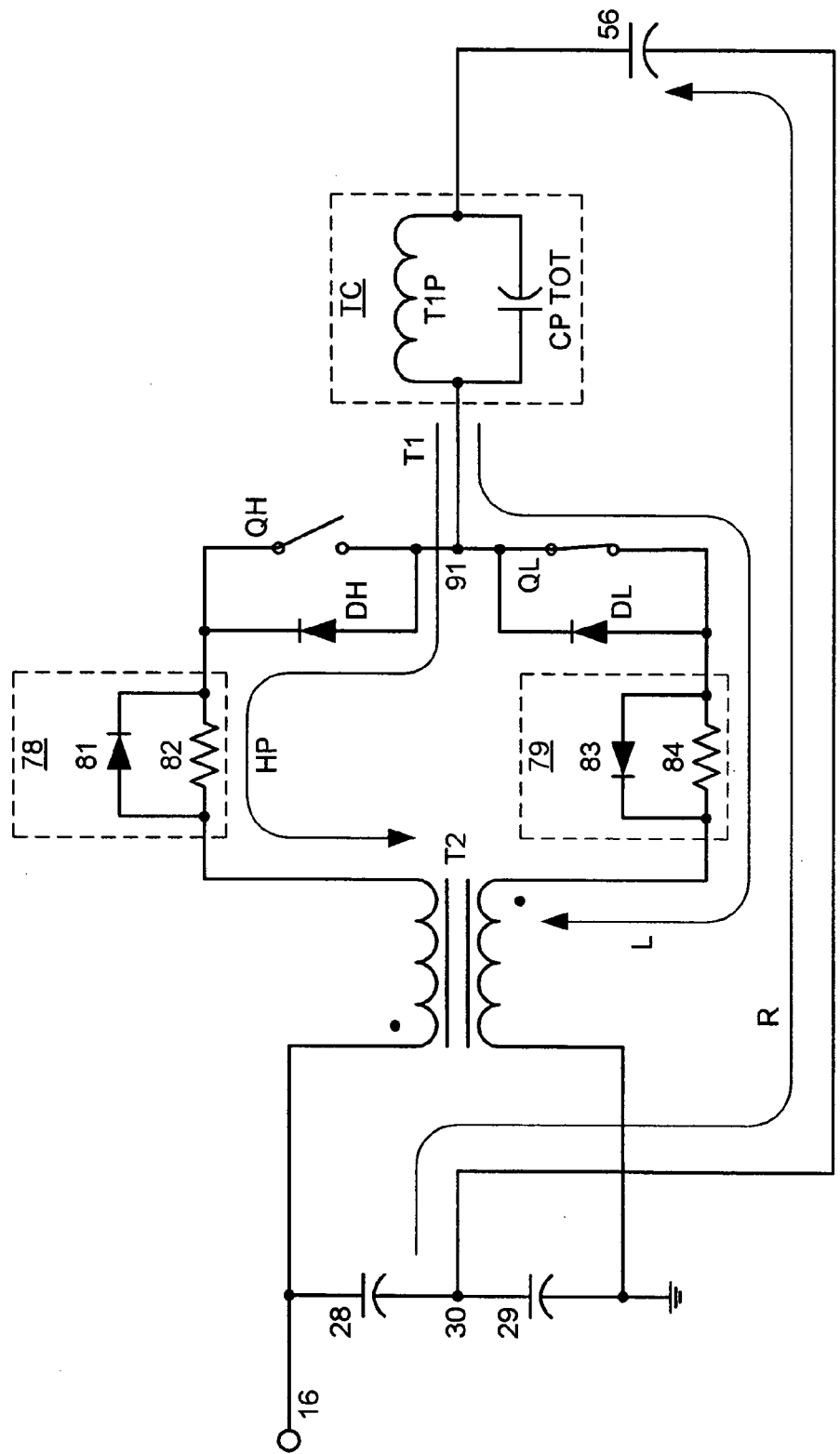
FIG. 10, the preferred embodiment, is essentially the same as in the schematic shown in FIG. 8, except for the addition of Outline 78, comprising resistor 82 and diode 81, and Outline 79, comprising resistor 84 and diode 83, to minimize parasitic currents.

This shoot-through current is unique to current fed circuits of this type and differs from the shoot-through current commonly seen in voltage fed half bridge circuits. It can cause circuit failure if not controlled. In the preferred embodiment, shown in FIG. 9, diode-resistor parallel circuit elements shown in Outlines 78 and 79 serve to minimize the above mentioned parasitic currents, and thus reduce circuit heating so that the useful life and reliability of the inverter can be improved. The details of the circuit action are shown in FIG. 10. For the same switching state as discussed above whereby switch QL is closed, diode 81 becomes reversed biased during the transient interval, and any parasitic current is effectively reduced by bypass resistor 81, reducing the heating effect on the remaining circuit elements. During the complementary switch interval when the states of QH and QL are interchanged, the main power flow is through diode 81, causing little power loss, and the diode-resistor pair represented in Outline 78 serve the same purpose as Outline 79 did during the previous switch interval. Thus, normal circuit function proceeds with reduced parasitic currents.

The last novel feature is the mechanism used to cycle the inverter at a slow periodic rate during a condition when the ballast is energized with AC power, but no lamps or defective lamps are present. This feature has not generally been used in the lighting industry for instant start ballasts, but adds to product reliability as it reduces circuit temperatures during a circuit operation mode that as the potential for causing overheating. This mechanism is shown as Outline 80 of FIG. 9, and FIG. 11. The first part of the circuit is the MOSFET Switch 85 in Outline 80 of FIG. 9. The gate of MOSFET 85 is controlled by a dc signal that is a rectified, filtered version of the main PFC MOSFET 27 gate drive signal on pin 7 of IC 24, node 90 on the schematic of FIG. 9. This signal is only present in a steady fashion when the PFC circuit is delivering power to a load. When the boost converter is disabled, the gate drive 90 is held at zero and an increased voltage drop results across capacitor 56 that causes the AC voltage at node 30A of FIGS. 9 and 11 increases in magnitude. The DC voltage at node 30A is blocked by means of capacitor 96 of FIG. 11. The coupled AC waveform is than converted into a DC control voltage by rectifier-filter 92 and applied to the base of small signal transistor 106 via circuit elements in 94. This base drive saturates transistor 106, and effectively grounds the anode of unijunction UJT transistor 108. The UJT transistor 108 is wired as a relaxation circuit shown in Outline 93. If the lamps are removed from the ballast, the AC signal at node 30A decreases sharply, the rectified output from the rectifier-filter 92 approaches zero, and transistor switch 106 opens so that capacitor 107 can slowly charge through resistor 109. Resistor 109 is connected to the PFC IC supply, signal 54 of FIG. 5. When the anode voltage of UJT 108 exceeds its gate voltage by a slight amount, then the UJT 108 anode-cathode pathway conducts, and a strong current pulse is injected into the base of Darlington transistor 95. This transistor provides a low resistance across the IC 24 chip supply filter capacitors 43 of FIG. 5, discharging them, reducing IC 24 supply voltage to a low value, and disabling the PFC IC 24. When disabled, the gate signal 90 stops, shutting off the inverter via MOSFET circuit in Outline 80. When capacitor 107 fully discharges, the UJT 108 opens and the IC chip supply slowly charges. When the chip supply on-threshold voltage is reached, PFC operation restarts, and the inverter shut-off MOSFET switch 85 closes, allowing Diac circuit 114 to restart inverter operation. If no lamps are connected the entire cycle repeats again and again. The cyclic removal of power from the PFC and inverter stages during part of the repeat cycle provides for lower internal component temperatures that add to the overall reliability of the product.

It should be understood that there may be numerous modifications, advances or changes that can be made to the present invention, but in doing so, it is intended that they should not detract from the true spirit of the present invention.

What is claimed is:

1. An electronic ballast capable of energizing a plurality of gas discharge lamps connected in a parallel configuration comprising a power factor correcting boost converter capable of being used over a wide range of alternating current (AC) line voltages to provide regulated power to a self-oscillating sine wave inverter that drives the plurality of gas discharge lamps at high frequencies, and at least one diode-resistor parallel circuit within said self-oscillating sine wave inverter to minimize parasitic currents and reduce circuit heating, and said power factor correcting boost converter including a Zener diode based coupling circuit which adds a direct current (DC) offset to sampled alternating current (AC) line voltages.

2. The electronic ballast capable of energizing a plurality of gas discharge lamps connected in a parallel configuration in accordance with claim 1, wherein said at least one diode-resistor parallel circuit includes at least one diode and a bypass resistor.

3. The electronic ballast capable of energizing a plurality of gas discharge lamps connected in a parallel configuration in accordance with claim 1, further including a first diode-resistor parallel circuit and a second diode-resistor parallel circuit to minimize parasitic currents and reduce circuit heating.

4. The electronic ballast capable of energizing a plurality of gas discharge lamps connected in a parallel configuration in accordance with claim 1, wherein said Zener diode is serially connected to form a coupling circuit, that includes at least one Zener diode and a filter including at least one capacitor and at least one resistor.

5. An instant start electronic ballast that energizes a plurality of gas discharge lamps connected in parallel comprising a mechanism that cycles a self-oscillating half-bridge inverter on and off at a slow periodic rate, under control of a zero lamp sense circuit;
wherein a MOSFET switch provides a steady gate signal while delivering power to a load, but is switched off when its boost converter is disabled, stopping the inverter oscillation during a condition when said plurality of gas discharge lamps is electrically connected, but no lamps, defective or inoperative lamps are present resulting in a reduction of circuit temperatures in said condition;
wherein said mechanism repeats the on and off cycle until restoration of the load, whereupon the MOSFET switch closes and a diac circuit restarts operation of said half-bridge inverter; and normal operation is resumed upon installation of a new lamp, without disconnection and reconnection of an AC power source.

6. An electronic ballast capable of energizing a plurality of gas discharge lamps connected in a parallel configuration comprising:
 a. a power factor correcting boost converter capable of being used over a wide range of alternating current (AC) line voltages to provide regulated power to a self-oscillating sine wave inverter that drives the plurality of gas discharge lamps at high frequencies, said power factor correcting boost converter including a Zener diode based coupling circuit which adds a direct current (DC) offset to sampled alternating current (AC) line voltages;
 b. a mechanism capable of cycling an inverter on and off at a periodic rate during a condition when the electronic ballast is energized with alternating current (AC), when said plurality of gas-discharge lamps is electrically connected but inoperative; and
 c. further including at least one diode-resistor parallel circuit to minimize parasitic currents and reduce circuit heating.

7. The electronic ballast capable of energizing a plurality of gas discharge lamps connected in a parallel configuration in accordance with claim 6, wherein said at least one diode-resistor parallel circuit includes at least one diode and a bypass resistor.

8. The electronic ballast capable of energizing a plurality of gas discharge lamps connected in a parallel configuration in accordance with claim 6, further including a first diode-resistor parallel circuit and a second diode-resistor parallel circuit to minimize parasitic currents and reduce circuit heating.

9. The electronic ballast capable of energizing a plurality of gas discharge lamps connected in a parallel configuration in accordance with claim 6, wherein said a serially connected Zener diode based coupling circuit includes at least one Zener diode and a filter including at least one capacitor and at least one resistor.

10. The electronic ballast capable of energizing a plurality of gas discharge lamps connected in a parallel configuration in accordance with claim 6, wherein said mechanism includes a MOSFET switch controlled by rectified direct current (DC).

11. The electronic ballast capable of energizing a plurality of gas discharge lamps connected in a parallel configuration in accordance with claim 10, wherein the voltage to said MOSFET switch is provided by a diode and a filtered voltage divider.

12. The electronic ballast capable of energizing a plurality of gas discharge lamps connected in a parallel configuration in accordance with claim 11, further including a diac circuit which acts to restart the operation of said inverter.

13. The electronic ballast capable of energizing a plurality of gas discharge lamps connected in a parallel configuration in accordance with claim 6, further including a diac circuit which acts to restart the operation of said inverter.

14. A circuit for exciting a plurality of gas-discharge lamps comprising:
 a. a first subcircuit to rectify a first alternating current (AC) voltage forming a pulsating DC voltage;
 b. a power factor correction subcircuit to boost said pulsating DC voltage to form a higher DC voltage;
 c. a third subcircuit to convert said higher DC voltage to a second AC voltage for exciting said plurality of gas-discharge lamps, wherein a frequency of said second AC voltage is higher than a frequency of the first AC voltage; and
 d. said power factor correction subcircuit further comprising circuitry to periodically interrupt power to said third subcircuit when a zero lamp state is detected.

15. The circuit for exciting a plurality of gas-discharge lamps as recited in claim 14, wherein said power factor correcting boost converter periodically interrupts the power to said third subcircuit when said plurality of gas-discharge lamps is electrically disconnected from said circuit.

16. The circuit for exciting a plurality of gas-discharge lamps as recited in claim 14, wherein said power factor correcting boost converter periodically interrupts the power to said third subcircuit—when one or more of said plurality of gas-discharge lamps is absent or inoperative.

17. The circuit for exciting a plurality of gas-discharge lamps as recited in claim 14, wherein said plurality of gas-discharge lamps are connected in a parallel configuration.

18. A circuit for exciting a plurality of gas-discharge lamps comprising:
   a. a first subcircuit to rectify a first alternating current (AC) voltage forming a rectified voltage;
   b. a power factor correction subcircuit to boost said rectified voltage;
   c. a third subcircuit to convert said boosted rectified voltage to a second AC voltage for exciting said plurality of gas-discharge lamps, wherein a frequency of said second AC voltage is higher than a frequency of a said first AC voltage; and
   d. said third subcircuit further comprising a plurality of switching devices, an isolation choke, and a plurality of transient parasitic current limiting circuits to limit the transient parasitic current through said plurality of switching devices; at least one of said transient parasitic current limiting circuits comprising a diode and resistor connected in parallel that minimize the parasitic current, reduce circuit heating and provide an increase in reliability and useful life of the circuit; wherein said plurality of transient-parasitic current limiting circuits is connected between each of said plurality of switching devices and said isolation choke.

19. The circuit for exciting a plurality of gas-discharge lamps as recited in claim 18, wherein each of said plurality of transient parasitic current limiting circuits comprises a diode.

20. The circuit for exciting a plurality of gas-discharge lamps as recited in claim 19, wherein each of said plurality of transient parasitic current limiting circuits comprises a resistor.

21. The circuit for exciting a plurality of gas-discharge lamps as recited in claim 20, wherein said plurality of switching devices are bipolar transistors.

22. The circuit for exciting a plurality of gas-discharge lamps as recited in claim 20, wherein said plurality of switching devices are MOSFETs.

23. The circuit for exciting a plurality of gas-discharge lamps as recited in claim 18 wherein said plurality of gas-discharge lamps are connected in a parallel configuration.

24. An inverter circuit comprising:
   a. first and second switching devices connected in series;
   b. a positive feedback device for each of said switching devices arranged to provide alternate switching of said first and second switching devices;
   c. an isolation choke to provide current limiting;
   d. a starting circuit to initiate oscillation;
   e. bypass diodes to prevent reverse currents from flowing through said first and second switching devices;
   f. first and second transient parasitic current limiting circuits; and
   g. a resonant coupling device to transfer power to a load;
   each of said first and second transient parasitic current limiting circuits, at least one of said transient parasitic current limiting circuits comprising a diode and resistor connected in parallel, connected between each of said first and second switching devices and said isolation choke to limit the transient parasitic current through said first and second switching devices.

25. The inverter circuit as recited in claim 24, wherein said first and second switching devices are bipolar transistors.

26. The inverter circuit as recited in claim 24, wherein said first and second switching devices are MOSFETs.

27. The inverter circuit as recited in claim 24, wherein each of said first and second transient parasitic current limiting circuits comprises a diode.

28. The inverter circuit as recited in claim 24, wherein each of said first and second transient parasitic current limiting circuits comprises a resistor.

* * * * *